(12) United States Patent
Lindfors et al.

(10) Patent No.: US 7,799,300 B2
(45) Date of Patent: Sep. 21, 2010

(54) METHOD AND APPARATUS FOR REMOVING SUBSTANCES FROM GASES

(75) Inventors: Sven Lindfors, Espoo (FI); Jaako Hyvarinen, Espoo (FI)

(73) Assignee: ASM International N.V., Bilthoven (NL)

( * ) Notice: Subject to any disclaimer, the term of this patent is extended or adjusted under 35 U.S.C. 154(b) by 0 days.

(21) Appl. No.: 12/138,358

(22) Filed: Jun. 12, 2008

(65) Prior Publication Data

US 2009/0074964 A1    Mar. 19, 2009

Related U.S. Application Data

(63) Continuation of application No. 10/205,296, filed on Jul. 24, 2002, now abandoned, which is a continuation of application No. 09/619,820, filed on Jul. 20, 2000, now Pat. No. 6,506,352.

(30) Foreign Application Priority Data

Jul. 20, 1999    (FI) ....................................... 991628

(51) Int. Cl.
*B01D 53/56* (2006.01)
(52) U.S. Cl. ................................ 423/240 S; 423/240 R
(58) Field of Classification Search .............. 423/240 S, 423/240 R
See application file for complete search history.

(56) References Cited

U.S. PATENT DOCUMENTS

| | | | |
|---|---|---|---|
| 4,058,430 A | 11/1977 | Suntola et al. | |
| 4,389,973 A | 6/1983 | Suntola et al. | |
| 4,413,022 A | 11/1983 | Suntola et al. | |
| 4,840,921 A | 6/1989 | Matsumoto | |
| 4,940,213 A | 7/1990 | Ohmine et al. | |
| 5,102,637 A * | 4/1992 | Snyder et al. | ............ 423/240 S |
| 5,114,683 A | 5/1992 | Hirase | |
| 5,300,186 A | 4/1994 | Kitahara | |
| 5,316,793 A | 5/1994 | Wallace et al. | |
| 5,417,934 A | 5/1995 | Smith et al. | |
| 5,462,905 A | 10/1995 | Nagami et al. | |
| 5,569,455 A | 10/1996 | Fukui et al. | |
| 5,601,651 A | 2/1997 | Watabe | |
| 5,688,479 A | 11/1997 | Chao | |
| 5,819,683 A | 10/1998 | Ikeda et al. | |
| 5,855,675 A | 1/1999 | Doering et al. | |
| 5,855,680 A | 1/1999 | Soininen | |
| 5,928,426 A | 7/1999 | Aitchison | |
| 6,015,590 A | 1/2000 | Suntola et al. | |
| 6,063,197 A | 5/2000 | Cox et al. | |
| 6,099,649 A | 8/2000 | Schmitt et al. | |
| 6,165,428 A | 12/2000 | Eijkhoudt et al. | |
| 6,193,802 B1 | 2/2001 | Pang et al. | |
| 6,197,119 B1 | 3/2001 | Dozoretz et al. | |
| 6,200,893 B1 | 3/2001 | Sneh | |
| 6,223,684 B1 | 5/2001 | Fujioka et al. | |
| 6,238,514 B1 | 5/2001 | Gu | |
| 6,305,314 B1 | 10/2001 | Sneh et al. | |
| 6,306,216 B1 | 10/2001 | Kim et al. | |
| 6,332,925 B1 | 12/2001 | Noji et al. | |
| 6,334,304 B1 | 1/2002 | Machida et al. | |
| 6,398,837 B1 | 6/2002 | Alvin et al. | |
| 6,506,352 B1 | 1/2003 | Lindfors et al. | |
| 6,514,905 B1 | 2/2003 | Hanaki et al. | |
| 6,770,145 B2 | 8/2004 | Saito | |
| 2001/0000866 A1 | 5/2001 | Sneh et al. | |
| 2001/0048902 A1 | 12/2001 | Hertzler et al. | |
| 2002/0187084 A1 | 12/2002 | Lindfors et al. | |

FOREIGN PATENT DOCUMENTS

| | | |
|---|---|---|
| EP | 0 823 279 A2 | 2/1998 |
| FI | 84980 | 11/1991 |
| WO | WO 99/23686 | 7/1999 |

* cited by examiner

*Primary Examiner*—Edward M Johnson
(74) *Attorney, Agent, or Firm*—Knobbe, Martens, Olson & Bear, LLP

(57) ABSTRACT

The present invention concerns a method and an apparatus for removing substances from gases discharged from gas phase reactors. In particular, the invention provides a method for removing substances contained in gases discharged from an ALD reaction process, comprising contacting the gases with a "sacrificial" material having a high surface area kept at essentially the same conditions as those prevailing during the gas phase reaction process. The sacrificial material is thus subjected to surface reactions with the substances contained in the gases to form a reaction product on the surface of the sacrificial material and to remove the substances from the gases. The present invention diminishes the amount of waste produced in the gas phase process and reduces wear on the equipment.

14 Claims, 4 Drawing Sheets

METHOD AND APPARATUS FOR REMOVING SUBSTANCES FROM GASES

RELATED APPLICATIONS

This application is a continuation of application Ser. No. 10/205,296, filed Jul. 24, 2002, which is a continuation of U.S. patent application Ser. No. 09/619,820, filed Jul. 20, 2000, which claims the priority benefit under 35 U.S.C. §119 of prior Finnish Application No. 991628, filed Jul. 20, 1999.

BACKGROUND OF THE INVENTION

1. Field of the Invention

The present invention relates to the removal of substances contained in gases, such as gases flowing at low pressure. In particular, the present invention concerns a method and an apparatus for removing unreacted reactants and vapor phase precursors present in gases removed from vapor phase reactors.

2. Description of the Related Art

In the atomic layer deposition method (ALD), the substrate is typically located in a reaction space, wherein it is subjected to alternately repeated surface reactions of at least two different reactants. Commercially available technology is supplied by ASM Microchemistry Oy, Espoo Finland under the trademark ALCVD™. According to the method, the reactants are admitted repetitively and alternately one reactant at a time from its own source in the form of vapor-phase pulses in the reaction space. Here, the vapor-phase reactants are allowed to react with the substrate surface for the purpose of forming a solid-state thin film on the substrate, particularly for use in the semiconductor arts.

While the method is most appropriately suited for producing so-called compound thin films, using as the reactants starting materials or precursors that contain component elements of the desired compound thin-film, it may also be applied to growing elemental thin films. Of compound films typically used in the art, reference can be made to ZnS films employed in electroluminescent displays, whereby such films are grown on a glass substrate using zinc sulfide and hydrogen sulfide as the reactants in the growth process. Of elemental thin films, reference can be made to silicon thin films.

An ALD apparatus comprises a reaction space into which the substrate can be placed, and at least two reactant sources from which the reactants used in the thin-film growth process can be fed in the form of vapor-phase pulses into the reaction space. The sources are connected to the reaction space via reactant inflow channels. Outflow channels (pumping lines) are attached to a pump and connected to the reaction space for removing the gaseous reaction products of the thin-film growth process, as well as the excess reactants in vapor phase.

The waste, i.e., the non-reacted reactants removed and discharged from the reaction space, is a serious problem for ALD processing. When it enters the pumping line and the pump, the waste gives rise to tedious cleaning and, in the worst case, the pump will rapidly be worn out.

Filtering of the gases and/or contacting of the gases with absorbents gives some help but both methods have been shown to be unsatisfactory in the long run. Building expensive heated pumping lines in order to move the waste though the pump does not help, because the problematic waste does not comprise superfluous amounts of separate precursors, such as water, titanium chloride or aluminum chloride, that can easily be pumped as separate materials. The problem arises when the materials are reacting, forming by-products having a lower vapor pressure, inside the pumping line. The problem is especially relevant when the reactants react with each other at temperatures lower than the intended process temperature, causing improper reactions. At those temperatures, oxychlorides might form in exhaust lines as a by-product of exemplary metal oxide deposition processes using metal chlorides as one of the ALD precursors. These by-products form a high volume powder. Typically this kind of reaction happens inside the pumping line between the reaction zone and the colder parts of the pumping line. Another problem occurs when precursors with a high vapor pressure at room temperature reach the pump sequentially at temperatures suitable for film growth. This might lead to a film material build-up on the surfaces of the pump. The material build-up can be very abrasive. This is a specific problem with heated pumping lines and hot dry pumps. This will cause the filling of tight tolerances and due to that the parts will contact each other and pump will crash. A third problem is the reactions between condensed portions of the previous reaction component and the vapor of the following pulse in the pumping line. This will cause CVD-type material growth and significant powder propagation.

As mentioned above, different solutions based on filtering and/or chemical treatment of the reaction waste have been tried for decades in process fore-lines, with more or less poor results. Formed by-products and powder tend to block the filters and due to the low process pressure the gas flow is too weak to keep the mesh of the filter open. The blocked filter will cause an additional pressure drop and therefore cause changes in the material flow from the source. Also, the process pressure and the speed of the gases will change. Attempts have been made to use cyclones and rotating peelers to remove the by-products from the mesh. By these means, some of the solid waste can be removed, but still the precursors with high vapor pressure will reach the pump and form by-products there.

Finnish Patent No. 84980 (Planar International Oy) discloses a system consisting of a condensation chamber, where the gas stream is slowed down and where a big part of the waste is condensed. Before entering the filter unit, extra water is injected into the filter housing to increase the by-products' particle size in order to prevent blockage of the filter mesh before the waste is removed by a rotating peeler system. Although this apparatus represents a clear improvement of the state of the art, it is still not completely satisfactory.

SUMMARY OF THE INVENTION

It is an aim of the present invention to eliminate the problem of the prior art and to provide a simple and reliable technical solution for removing waste from the reaction zone of an ALD reactor.

The present invention is based on the concept of processing all of the extra precursor material of the pulse dose, to form the end product, before the precursors are discharged from the reactor or the reaction zone. Thereby, the volume of the waste can be greatly reduced. The postprocessing of the precursor excess stemming from the ALD process is carried out by placing a sacrificial material with a high surface area (typically porous) in the reaction zone, which is swept by the precursors during their travel to the outlet of the reaction chamber. Alternatively, the material with high surface area can be placed in a separate heated vessel, outside the reaction zone but upstream of the discharge pump. The material with a high surface area is, however, in both embodiments kept essentially the growth conditions (for example, same pressure and temperature) as the reaction zone to ensure growth of a reaction product on the surface thereof. As a result, the material with a high surface area traps the remaining end product on its surface, thereby reducing the amount of reactant reaching the pump.

The present apparatus includes a reaction zone arranged downstream from (i.e., after) the reaction process, comprising a material with a high surface area and maintainable at essentially the same conditions as those prevailing during the gas phase reaction process. The reaction zone further includes gas flow channels for feeding gases discharged from the gas phase reaction process into the material with a high surface area and discharge gas channels for discharging gas from the material with a high surface area.

Considerable advantages are obtained with the present invention. Thus, the material with a high surface area will trap on its surface the end product of the reaction of the excess gaseous reactants. The surface area of the trap is generally large, on an average about 10 $m^2/g$ to 1000 $m^2/g$; for example it can have the surface area on the same order as that of a soccer stadium. The trap can be in use for several runs before it is cleaned or replaced with a new one. The pump connected to the reaction space has only to cope with materials in gaseous form because mostly non-reactive gaseous by-products from the process reach the pump. "Non-reactive," as used herein, refers to species other than the intended ALD reactants. The solid thin film product is substantially captured in the reactant trap; this will considerably reduce wear of the equipment.

The present invention is generally applicable to any gaseous reactants. It is particularly advantageous for reactions that form corrosive or otherwise harmful side products during the reaction of the gaseous reactants. Thus, a preferred embodiment is for dealing with the waste generated in a vapor phase reaction using chloride-containing reactants such as aluminum chloride, which are reacted with water to produce a metal oxide. The present invention is preferably used for ALD, but it can also be used for treating exhaust from conventional CVD processing or electron beam sputtering and any other gas phase processes in which the discharged gaseous reactants may react with each other downstream of the actual reaction zone housing the substrate. In the following description, the invention will, however, be described with particular reference to an ALD embodiment.

BRIEF DESCRIPTION OF THE DRAWINGS

Next the invention will be examined in more detail with reference to the attached drawings depicting a number of preferred embodiments.

DETAILED DESCRIPTION OF THE PREFERRED EMBODIMENT

Figure 1A:
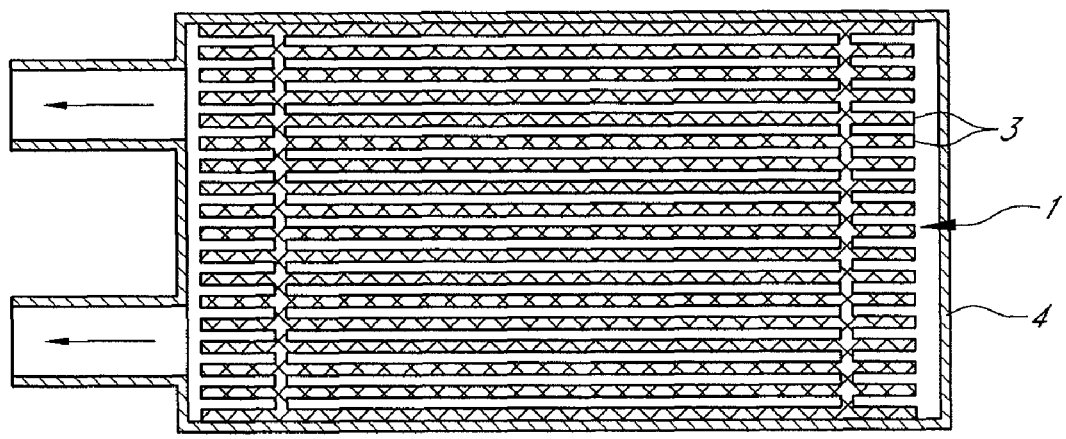
FIGS. 1a and 1b are schematic top plan (FIG. 1a) and side elevational (FIG. 1b) views of a reactant trap comprising porous plates inside a suction box of an ALD reactor, constructed in accordance with a first preferred embodiment.

Generally, the present invention is based on the idea of placing—between the substrates of an ALD reactor and the pump—a material with a high surface area, which forms a postreaction substrate for the discharged superfluous gas phase reactants leaving the actual reaction zone. It is preferred that the surface of the porous material is so large that all of the superfluous material can adsorb upon surfaces of the reactant trap and then be converted into the corresponding final compound when the next reactant pulse enters, according to the principle of ALD (Atomic Layer Deposition).

The postreaction reactant trap can be placed inside the vacuum vessel, within the hot reaction zone, or it can be formed as a separate chamber between the process chamber (or primary reaction zone) and the pump; even the space of the suction box can be used as a holder for the trapping receptacles.

The following example relates to growing an aluminum oxide layer with the ALD technique. In a 3,000 cycle $Al_2O_3$ process, 100 g of $AlCl_3$ and 100 g of $H_2O$ is consumed. Roughly one-third (60 g) of the reactants ends up as $Al_2O_3$, of which aluminum represents 30 g and oxygen represents 30 g. Two-thirds of the consumed reactant mass will form HCl in an amount of 140 g. One-third, equaling 20 g of the precursors, is used in the thin film product grown on the substrates; the remaining two-thirds (40 g) of $Al_2O_3$ is preferably captured by the trap. This means roughly 40 g of solids in the trap per run. The deposited $Al_2O_3$ in each run has a thickness of 150 nm, which corresponds to a film growth of 15 μm on the trap surface after 100 runs. By selecting the pore size and path length so that there is essentially no pressure drop over the trap and that any reaction products can be purged away before the next pulse enters the trap, the thin film grown in the trap will not restrict the gas flow.

It is particularly desirable to avoid formation of large molecules, such as oxychlorides, that would occupy a large volume and block the flow paths of the material with a high surface area.

According to the preferred embodiment, the sacrificial trapping block(s) or plates can be made of any suitable material with a high surface area, preferably porous (e.g., graphite, such as porous graphite foils, alumina (Al2O3) or silica). Various ceramic materials, e.g., honeycomb ceramics, and other mineral materials such as glass wool, can also be used. Reticulated Vitreous Carbon is another example of a suitable material. The material should withstand the physical and chemical conditions of the reaction zone (reaction temperature and pressure; it should be chemically inert to the reactants but able to adsorb the ALD reactants). Further it should have a large surface so as to allow for a reaction of the gaseous reactants on the surface thereof in order to form the reaction product (such as aluminum oxide). Generally, the surface area of the trap material is 10 $m^2/g$ to 2000 $m^2/g$, in particular about 100 $m^2/g$ to 1500 $m^2/g$. One alternative is to have a porous ceramic material with a roughened surface which will allow for penetration of the gaseous reactants into the material, leaving by-products such as hydrochloric acid, on the surface so that it can be more easily purged away. The pores of the porous material should not be too narrow and deep so that the (non-reacted) residues of the previous pulse cannot be purged away before the next pulse is introduced. Material having an average pore size on the order of about 10 to 1000 m is preferred.

It is also preferred that the surface of the reactant trap is large enough that the same trap material can be used for the growth of several batches of thin-film elements. As discussed above, the excess of reactant is generally 4 to 5 times the amount needed for covering the surface of the substrates with a thin film of desired thickness. Therefore, the surface area of the material is preferably at least 4 to 5 times larger than the total surface of the substrates. More preferably, the surface should be much larger, e.g., so as to allow for uninterrupted operation for a whole day, depending on the production capacity of the reactor.

There should be no substantial pressure difference over the high surface area of the reactant trap. For this reason, the material with a high surface area is preferably provided with flow paths which allow for free flow of the gases while offering the gas phase components enough surface for surface reactions. Various ways of achieving free flow paths to achieve minimal pressure drops are depicted in the embodiments of the drawings.

Turning now to the attached drawings, it will be noted that in FIGS. 1a and 1b, the reactant trap 1 (which can also be called an "afterburner", a "downstream reaction space" or a "secondary reaction space") is preferably placed below the actual reaction space 2 (or "primary reaction space") of the ALD reactor. The reactant trap comprises a plurality of trapping plates 3, which are placed in parallel relationship inside the suction box 4 of the reactor. Between the trapping plates 3 there are flow channels formed to allow for the continued flow of the gases to the pump (not shown). When the trapping plates are made of a suitable material with a high surface area, the reactant gases will diffuse inside the plates and deposit the reactants due to surface reactions similar to those reactions taking place in the reaction space above, e.g., between glass substrates and the reactant vapors.

By arranging the reactant trap immediately after or under the reaction zone, a free flow path or channel for the excess reactants can easily be arranged. Likewise, it is simple to carry out the discharge of the gas from the reactant trap because it is subject to the same reduced pressure, produced by the discharge pump, as the rest of the reactor.

After each reactant pulse fed in to the reaction space and, consequently, into the reactant trap 1, the reaction space is generally purged with an inert or inactive gas, such as nitrogen. Then a subsequent gas phase pulse is fed into the reaction space (and thence into the reactant trap). Thus, in the example of an ALD $Al_2O_3$ process, an aluminum chloride pulse is usually followed by a water vapor pulse in the reaction space to convert the aluminum chloride into aluminum oxide. The same reaction takes place on the surface of the substrates placed in the ALD reactor and in the reactant trap. By placing the reactant trap inside the same reaction space or reaction box as the substrates, the necessary temperature and pressure levels for achieving an ALD (Atomic Layer Deposition) reaction on the surface of the trapping material are automatically obtained. The reactants will form the same end product, e.g., ATO or $Al_2O_3$, on the surface of the trap as on the substrates.

Figure 1B:
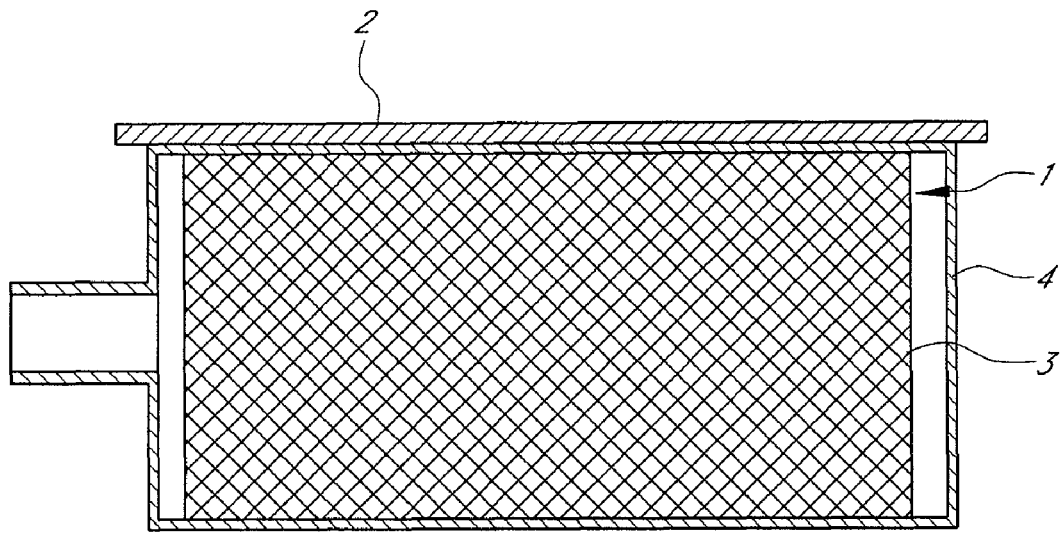
Figure 2A:
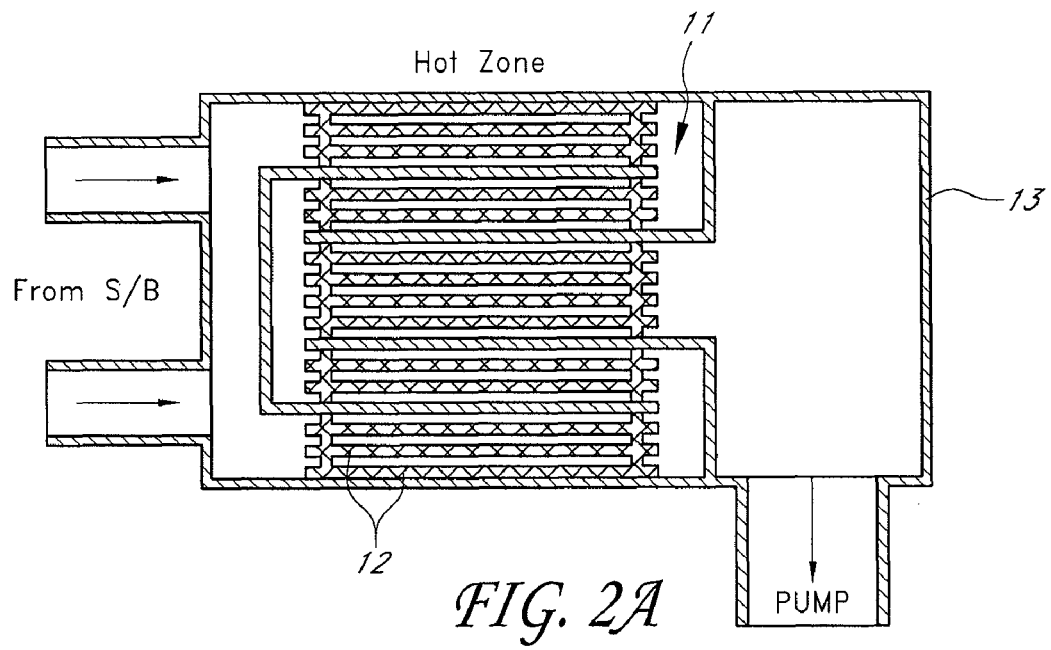
FIGS. 2a and 2b are schematic top plan (FIG. 2a) and side elevational (FIG. 2b) views of a reactant trap, constructed in accordance with a second preferred embodiment of the present invention, having an arrangement of plates inside a separate postreactor connected to the suction box of an ALD reactor.
Figure 2B:
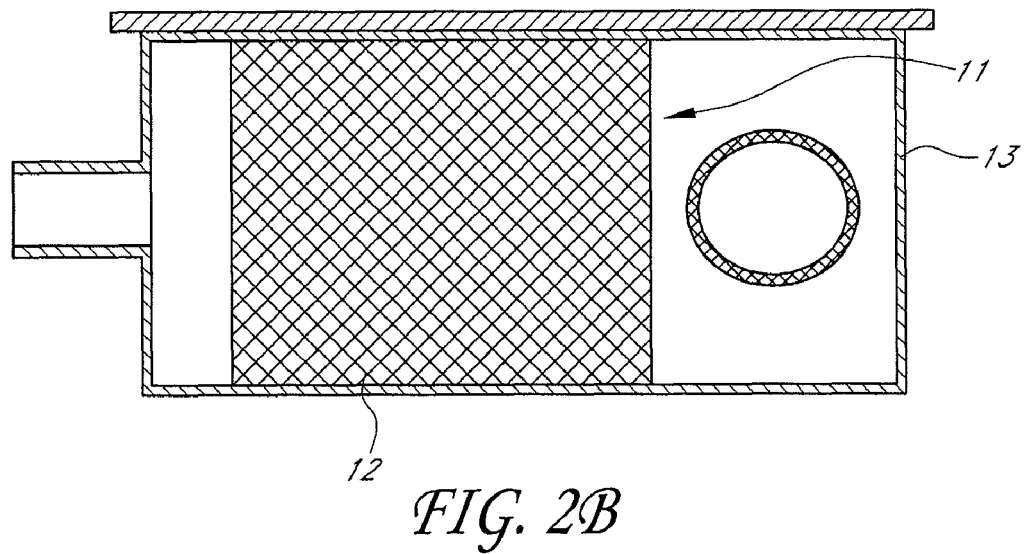

The embodiment of FIGS. 2a and 2b is similar to that of FIGS. 1a and 1b, with the exception that the reactant trap 11 is placed in a separate vessel 13 kept at the same reaction conditions as the reactor. The trapping plates 12 are arranged in a similar fashion as the plates in FIGS. 1a and 1b, but the flow channel is arranged to provide a serpentine path. In this way, a sufficient contact time with the trapping plates can be provided. The reactant trap vessel is attached to the suction box of an ALD reactor with a conduit.

Figure 3A:
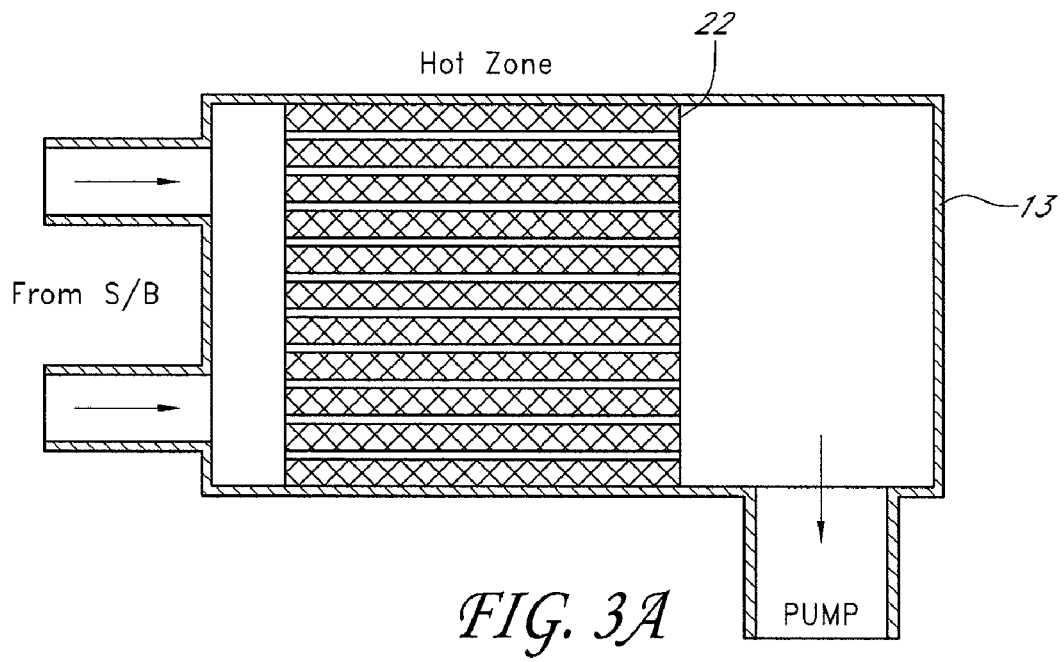
FIGS. 3a and 3b are views corresponding to FIGS. 2a and 2b, with the plates replaced by glass wool cartridges, in accordance with a third embodiment.
Figure 3B:
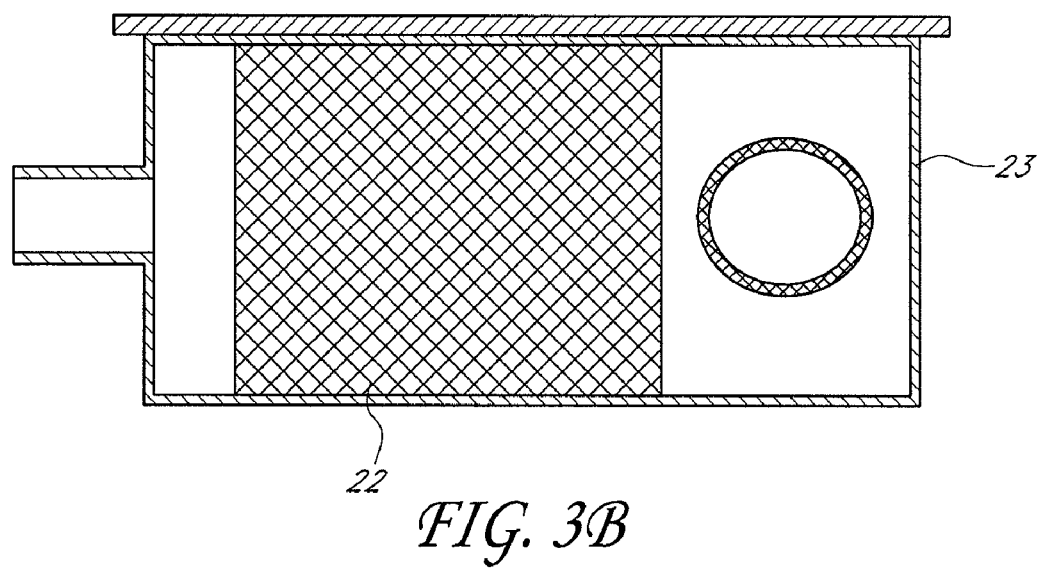

The embodiment of FIGS. 3a and 3b corresponds to a combination of the embodiment of FIGS. 1 and 2, in the sense that the trapping plates 22 are placed in a separate vessel 23, but the plates are fixed in parallel relationship with flow paths between them. The plates 22 of the illustrated embodiment are made of glass wool.

Figure 4A:
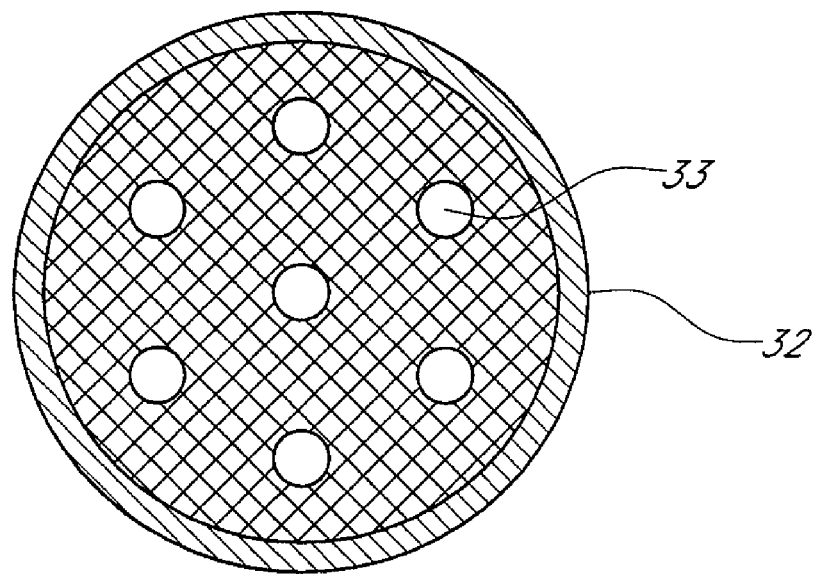
FIGS. 4a and 4b are schematic cross-sections of a cartridge filled with glass wool (FIG. 4a) and a cartridge filled with graphite foil (FIG. 4b).
Figure 4B:
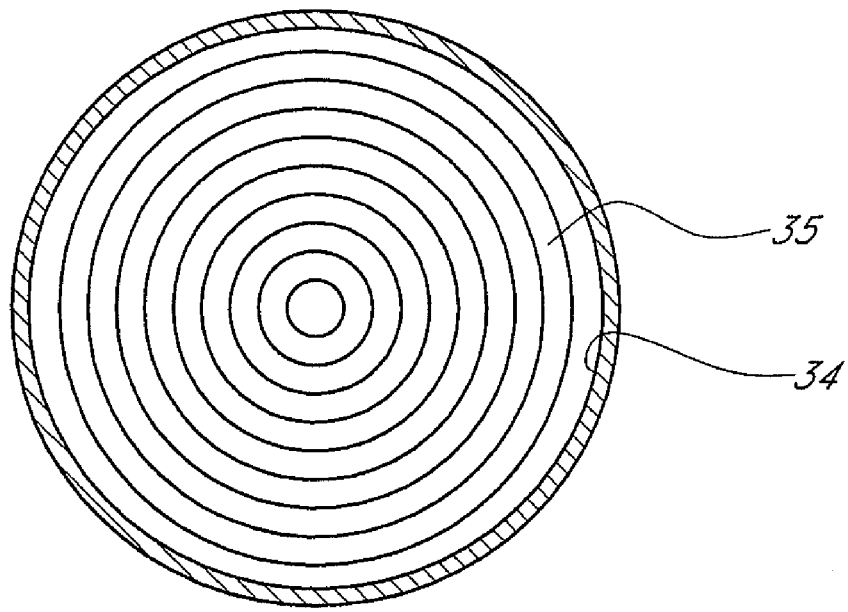

FIGS. 4a and 4b show replaceable cartridges 32 made of material with a high surface area, such as glass wool (FIG. 4a) with flow paths 33 formed in said material. Similar flow paths 35 are arranged between adjacent layers of a graphite foil 34 wound in a spiral fashion in FIG. 4b. The layers are preferably arranged at a distance of about 0.1 mm to 10 mm, preferably about 0.5 mm to 5 mm from each other.

The traps of FIGS. 4a and 4b are preferably made of an inexpensive material, such that they can be thrown away after an effective period of use.

In the embodiments of all of the FIGS. 2 to 4, the operation of the precursor trap is quite similar to that described in connection with the embodiment of FIGS. 1a and 1b. The material with a high surface area is maintained at a temperature similar to that of the actual reaction zone (i.e., depending on the precursors and the substrate, preferably about a 50° C. to 600° C., more preferably about 200° C. to 500° C.). The pressure can be atmospheric, but it is generally preferred to work at reduced pressure of about 1 mbar to 100 mbar (i.e., "low pressure"). The inactive gas used for purging preferably comprises nitrogen or a noble gas such as argon.

Although the above embodiments have particular utility in the preparation of thin-film structures on all kinds of surfaces for semiconductor and flat panel devices, it should be noted that it can be applied to any chemical gas vapor deposition reactor (e.g., CVD or ALD), including the preparation of catalysts using thin film coatings.

What is claimed is:

1. A method for removing substances contained in exhaust gases discharged from gas phase reaction processes, comprising:

carrying excess reactant from gas phase pulses of an atomic layer deposition (ALD) process conducted upon a deposition substrate under a first set of reaction conditions; and directing the excess reactant to contact a sacrificial material downstream of the substrate and maintained at substantially the first set of reaction conditions.

2. The method of claim 1, wherein the sacrificial material comprises a porous substrate.

3. The method of claim 2, wherein directing comprises conducting the ALD process on the sacrificial material to leave a sacrificial layer having a composition that is substantially the same as a layer formed by the ALD process upon the deposition substrate.

4. The method of claim 2, wherein the porous material comprises a material selected from the group consisting of porous graphite materials, porous ceramics, alumina, silica and glass wool.

5. The method of claim 1, wherein the excess reactant includes a halide-containing gas.

6. The method of claim 5, wherein the halide-containing gas comprises a chloride-containing gas.

7. The method of claim 1, wherein the substrate and the sacrificial material are maintained within a single reaction space.

8. The method of claim 1, wherein the sacrificial material is placed in a downstream reaction space housing that is connected to an upstream reaction space housing the substrate.

9. The method of claim 1, wherein the sacrificial material has a surface area between about 10 m2/g and 2000 m2/g.

10. The method of claim 1, wherein at the first set of conditions the deposition substrate and sacrificial material are at a temperature between about 200° C. and 500° C.

11. The method of claim 10, wherein at the first set of conditions the deposition substrate and the sacrificial material are subjected to a pressure between about 1 mbar and 100 mbar.

12. The method of claim 1, wherein the sacrificial material has a surface area sufficient to react substantially all of the excess reactant.

13. The method of claim 1, wherein the sacrificial material comprises a porous material having an average pore size of about 10 μm to 100 μm.

14. A method of depleting excess reactant from an exhaust flow, comprising:

reacting a first part of a gaseous reactant with at least one substrate within a primary reaction space, wherein said reacting comprises an atomic layer deposition (ALD) process;

exhausting an excess part of the gaseous reactant that not reacted with said at least one substrate to a secondary reaction space downstream of the primary reaction space, said secondary reaction space being maintained at a set of conditions substantially the same as those prevailing in the primary reaction space during said reacting of the first part of the gaseous reactant;

further reacting the excess part of the gaseous reactant with a sacrificial material having a high surface area, wherein said further reacting comprises an ALD process; and exhausting by-product from the secondary reaction space, said by-product comprising by-product from said first reacting of the first past of the gaseous material and by-product from said further reacting of the excess part of the gaseous material.

\* \* \* \* \*

UNITED STATES PATENT AND TRADEMARK OFFICE
CERTIFICATE OF CORRECTION

| | | |
|---|---|---|
| PATENT NO. | : 7,799,300 B2 | |
| APPLICATION NO. | : 12/138358 | |
| DATED | : September 21, 2010 | |
| INVENTOR(S) | : Sven Lindfors et al. | |

It is certified that error appears in the above-identified patent and that said Letters Patent is hereby corrected as shown below:

Title Page, item [75], change "Jaako" to --Jaakko--.

In column 8, line 17, in claim 14, change "past" to --part--.

Signed and Sealed this
Eighth Day of March, 2011

David J. Kappos
*Director of the United States Patent and Trademark Office*